Sept. 30, 1958  J. H. BARKER ET AL  2,854,305
VENDING MACHINES

Filed June 14, 1954  6 Sheets-Sheet 1

INVENTOR.
Jack H. Barker
BY Joe B. Barker

ATTORNEYS

INVENTOR.
Jack H. Barker
BY Joe B. Barker

ATTORNEYS

Sept. 30, 1958   J. H. BARKER ET AL   2,854,305
VENDING MACHINES

Filed June 14, 1954   6 Sheets-Sheet 3

INVENTOR.
Jack H. Barker
BY Joe B. Barker

ATTORNEYS

Sept. 30, 1958    J. H. BARKER ET AL    2,854,305
VENDING MACHINES
Filed June 14, 1954    6 Sheets-Sheet 4

INVENTOR.
Jack H. Barker
BY Joe B. Barker
Ashley & Ashley
ATTORNEYS

Sept. 30, 1958    J. H. BARKER ET AL    2,854,305
VENDING MACHINES
Filed June 14, 1954                    6 Sheets-Sheet 6

INVENTOR.
Jack H. Barker
BY Joe B. Barker

ATTORNEYS

United States Patent Office 2,854,305
Patented Sept. 30, 1958

2,854,305

VENDING MACHINES

Jack H. Barker and Joe B. Barker, Denison, Tex.

Application June 14, 1954, Serial No. 436,601

5 Claims. (Cl. 312—97.1)

This invention relates to new and useful improvements in vending machines and is an improvement upon our co-pending application Serial No. 362,573, filed June 18, 1953, now Patent No. 2,811,403, dated October 29, 1957.

One object of the invention is to provide an improved vending machine which includes an upright rotatable carriage for supporting bulky articles, such as beverages in paper cartons or other fragile containers, on the peripheral surface thereof in alinement with an access or delivery opening having a closure, together with means for controlling the opening of the closure and for imparting intermittent rotation to the carriage to consecutively move the articles into registration with the access opening whereby the registering article may be readily removed and said articles are dispensed in sequential order without jostling and damaging the containers so as to cause leakage of the contents.

Another object of the invention is to provide an improved vending machine having articles to be dispensed rotatably supported in superimposed, annular rows with an access opening and closure for each row, and means arranged to lock the closures against opening and to unlock and permit opening of one of said closures during each complete revolution, said closures being unlocked in consecutive order upon successive complete revolutions and being relocked upon completion of a full revolution whereby only one closure may be opened during each revolution.

An important object of the invention is to provide an improved vending machine, of the character described, having novel drive means for imparting intermittent rotation to the carriage and coacting means for locking said carriage against rotation and actuated by the drive means so as to be released during rotation of said carriage, said drive means having releasable clutch means to permit disconnection of said carriage and prevent damage in the event of binding of said carriage.

A particular object of the invention is to provide an improved vending machine of the character described, having a latch for each closure and common operating means for the latches arranged to be actuated by the rotation of the carriage for releasing one of said latches upon each complete revolution of said carriage whereby said latches remain locked until released by the operating means.

A further object of the invention is to provide an improved vending machine, of the character described, wherein the latch operating means includes a rotatable member having means engageable with the individual latches of the closures to disengage said latches from their closures in sequence upon complete revolutions of the carriage with said carriage having means for imparting rotation to the member upon the completion of each revolution whereby said operating means remains stationary and holds one of the latches released during said carriage revolution.

Still another object of the invention is to provide an improved vending machine, of the character described, wherein the latch operating means includes means resisting rotation of its member and means engageable by the carriage means for rotating said member and arranged to indicate the relative position thereof as well as the closure having its latch released.

A construction designed to carry out the invention will be hereinafter described together with other features of the invention.

The invention will be more readily understood from a reading of the following specification and by reference to the accompanying drawings, wherein an example of the invention is shown, and wherein:

In the drawings, the numeral 10 designates the upright casing or housing of a vending machine having insulated top, bottom and side walls 11, 12 and 13 with a service door 14 on one side wall. The housing may be polygonal in cross-section and have a refrigeration unit 15 mounted on its top wall 11 so as to depend therethrough into the interior of said housing. A conventional coin control mechanism 16 and empty light 17 are mounted on the side wall 13 adjacent the door 14, which door has a longitudinal opening 18 with a plurality of superimposed closures or access doors 19 slidable horizontally thereof and an indicator or sight window 20 above the opening and closures. Suspended within the housing from its top and side walls is an angular, T-shaped frame or hanger 21 which supports an electric motor 22 and a right-angle speed reducer 23 below the refrigeration unit 15.

Figure 1:
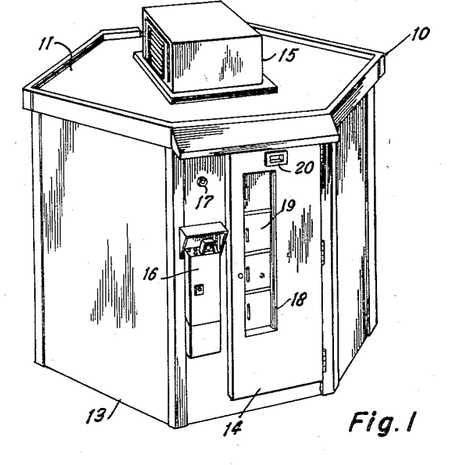
Fig. 1 is a perspective view of a vending machine constructed in accordance with the invention.
Figure 2:
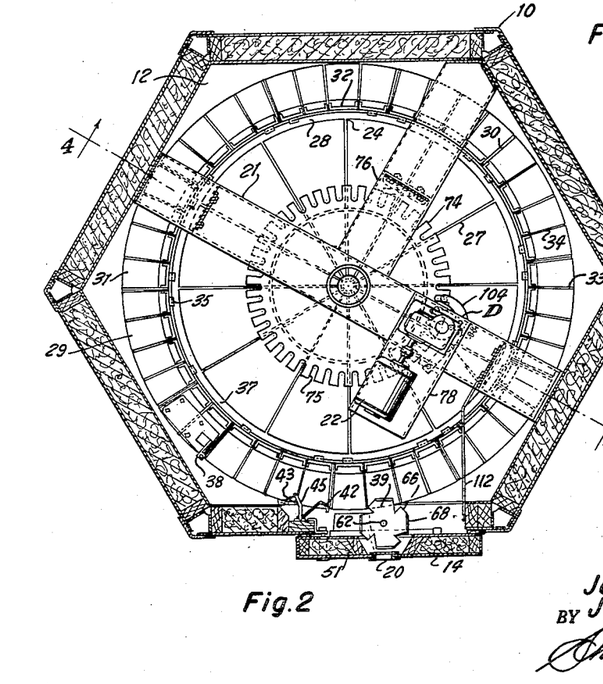
Fig. 2 is a horizontal, cross-sectional view of the vending machine, showing the rotatable carriage in plan.
Figures 4, 5, 16:
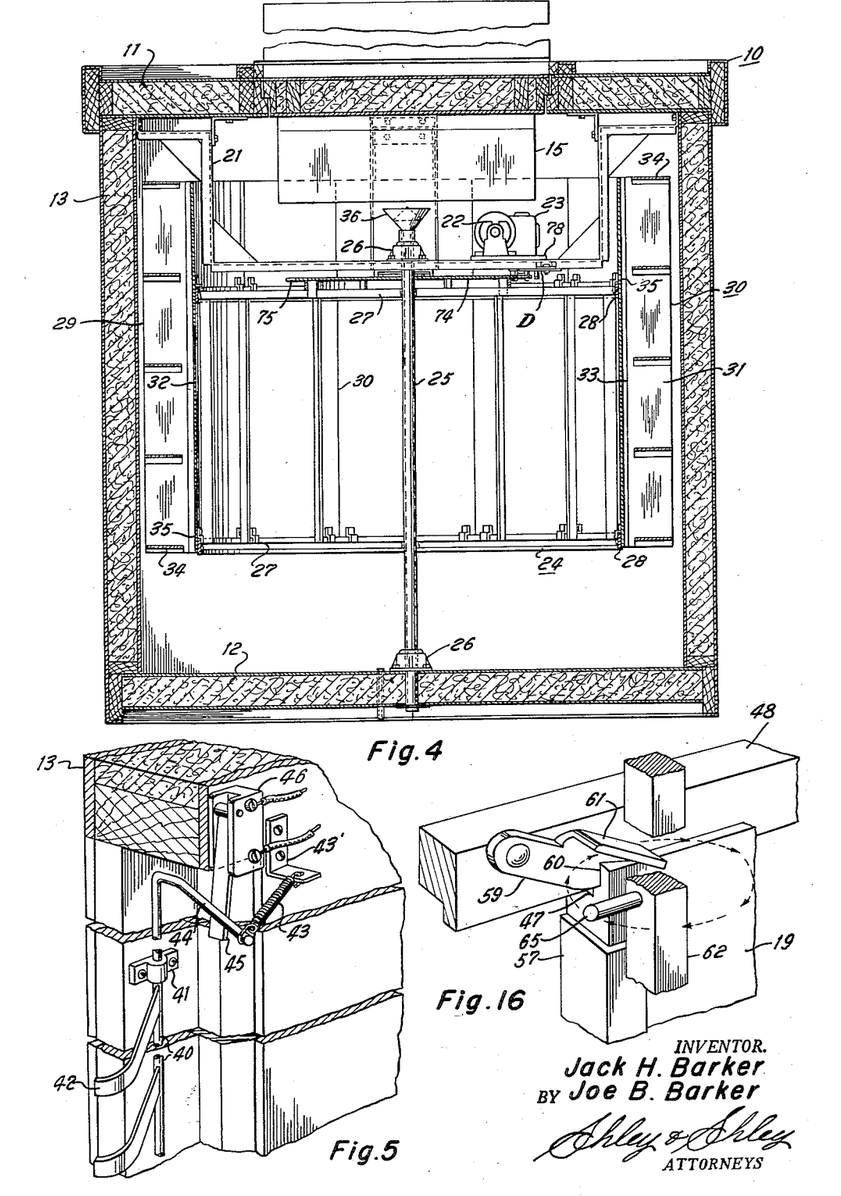
Fig. 4 is a transverse, vertical, sectional view, taken on the line 4—4 of Fig. 2.
Fig. 5 is an enlarged perspective view of a portion of the empty switch actuator.
Fig. 16 is an enlarged perspective view showing the relation of one of the closure latches and operating means.

For supporting articles to be vended, a substantially cylindrical carriage or reel 24 is mounted on an upright shaft 25 having its ends journaled in bearings 26 mounted on the bottom wall 12 and hanger 21. Preferably, the carriage 24 is in the form of an openwork frame having spiders 27 fixed on the shaft 25 in spaced relation and supporting peripheral frame members or annular bars 28. An annular, concentric magazine 29, having upright, transversely arcuate sections 30 of a length substantially equal to the length of the door opening 18 and a plurality of individual compartments or pockets 31 arranged in transverse and upright rows, is supported by the peripheral bars 28. Each magazine section 30 has an upright back wall 32 and upright and transverse partitions 33 and 34 with the outermost partitions forming the outer margins or walls of the section (Figs. 2 and 4). A plurality of hooks 35 are carried by the inner surface of the back wall 32 of each section for engaging the peripheral bars to removably support the section on the carriage 24. Each compartment 31 is adapted to receive an article to be vended, such as milk, other beverage or commodity in a paper carton or fragile container, and the transverse partitions 34 may be spaced from the back wall to facilitate circulation and cleaning. It is noted that the sections coact to form the annular magazine 29 with the compartments in superimposed, circumferential rows, and that said sections may project above the uppermost spider 27 and annular bar 28 in surrounding relation to the hanger 21, motor 22 and reducer 23.

The shaft 25 may be hollow and project above and below the bearings 26 and through the bottom wall 12 to provide a drain for condensation dripping from the refrigeration unit 15. A suitable collector 36 communicates with the open upper end of the shaft. As shown by the numeral 37, one of the magazine sections is fixed to the carriage and may have fewer compartments 31 so as to be of less width. An angular arm or element 38 is mounted on the top horizontal partition 34 of this section so as to project upwardly and radially from said section for actuating a latch operating means 39 upon each complete revolution of the carriage 24 (Figs. 2 and 17), as will be explained. For illuminating the empty light 17 and preventing operation of the machine when the compartments are empty, an upright actuator rod 40 is journaled in suitable bearings 41 on the inner surface of one of the side walls 13 in close proximity to the periphery of the magazine 29 and, preferably, adjacent the door 14. A plurality of resilient fingers 42, one for each circumferential row of compartments, extend laterally from the rod 40 in alined, spaced relation and are urged inwardly into engagement with the contents of said compartments by a spring 43 connected to the side wall by a suitable bracket 43' and to a lateral arm 44 carried by the upper end of said rod (Fig. 5). Also, the spring 43 urges the arm 44 into engagement with the lever 45 of a micro-switch 46 having electrical connection (not shown) with the empty light and coin control mechanism 16 whereby said light is illuminated and said mechanism prevented from operating the machine when the fingers and arm swing inwardly or counterclockwise. Of course, the presence of an article in one of the compartments holds the fingers and arm outwardly with the arm out of engagement with the switch lever 45 so that the empty light remains off and the coin mechanism in operation until the magazine 29 is completely empty.

One of the closures 19 is provided for each circumferential row of compartments and has longitudinal channels or grooves 47 in its upper and lower ends for sliding engagement with overlying and underlying, horizontal rails or tracks 48 and 49 secured to the inner surface of the door 14 transversely across and beyond or to the left of the access opening 18 (Figs. 12–16). It is noted that the ends of the rails are connected by upright stop members or bars 50 and that the intermediate rails 49 between adjacent closures slidably support both closures. Inwardly of the closures and in alinement with and forming a continuation of the outer access opening, an individual, inner access opening 51 is provided for each circumferential compartment row by transverse partitions 52 extending inwardly from the rails and having their ends connected to upright plates or walls 53. Each closure is urged toward the right and is held in its closed position by a roller 54 rotatably mounted on the upper end of an arm or lever 55 having its lower end pivotally supported on a bolt or pin 56 projecting inwardly from the lower rail of the closure. A wear strip 57 may overlie the inner or left-hand, upright edge portion of each closure for engagement by the roller 54, and the opposite or outer edge portion of the closure has a suitable external handle 58. The relative dimensions of the closure and its rails are such that opening movement of said closure may be limited by the roller engaging the inner stop bar 50 (Fig. 12) or by the handle 58 striking the left-hand wall of the outer access opening 18. In any event, the roller constantly bears against the wear strip 57 so that the weight of the lever constantly urges the closure toward its closed position. Closing movement may be limited by the handle striking the opposite wall or by the closure engaging the opposite stop bar.

For locking each closure against opening movement, an angular keeper element or latch 59 is pivoted to the rail above the closure and has a notch 60 in its free or outer end for engagement with the upper, left-hand corner of said closure (Fig. 16). Each latch has an inwardly-extending, lateral flange 61 to permit lifting and disengagement of the latch by the operating means 39 which is common to all of the latches. The latter includes an upright cam shaft or member 62 having its lower end journaled in a suitable bearing 63 and its upper end rotatably confined in an angular bearing plate or bracket 64 mounted on the door 14 above and below the top and bottom rails 48. A plurality of radial elements in the form of lugs or pins 65, one for each latch 59, are carried by the cam shaft for engaging the flanges 61 and lifting the latches upon rotation of said shaft. In order that only one latch be disengaged at a time and that all of the latches may be disengaged during successive complete revolutions of the cam shaft 62, the pins extend in angular, equally-spaced relation. When four closures and latches are employed as shown, the pins 65 extend at ninety degrees to adjacent pins. Although the sequence of operation is subject to variation, it is preferable for the latches to be released in consecutive order from top to bottom. It is noted that the latches remain engaged and lock their respective closures 19 against movement until lifted by the pins and that said latches are reengaged upon rotation of the cam shaft and disengagement of said pins, whereby only one latch is released at a time.

Figures 6, 7, 17:
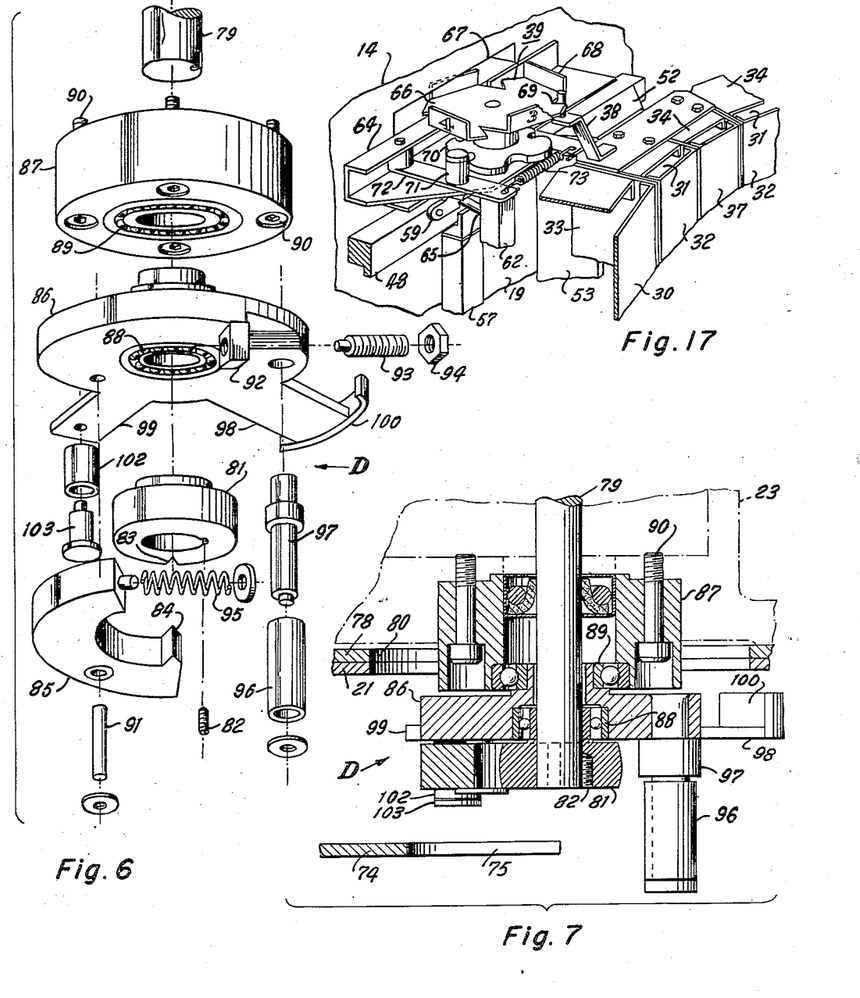
Fig. 6 is an exploded perspective view of the drive means.
Fig. 7 is a transverse, vertical, sectional view of the drive means.
Fig. 17 is an enlarged perspective view showing the rotation of the operating means by the carriage means.
Figures 12, 13, 14, 15:
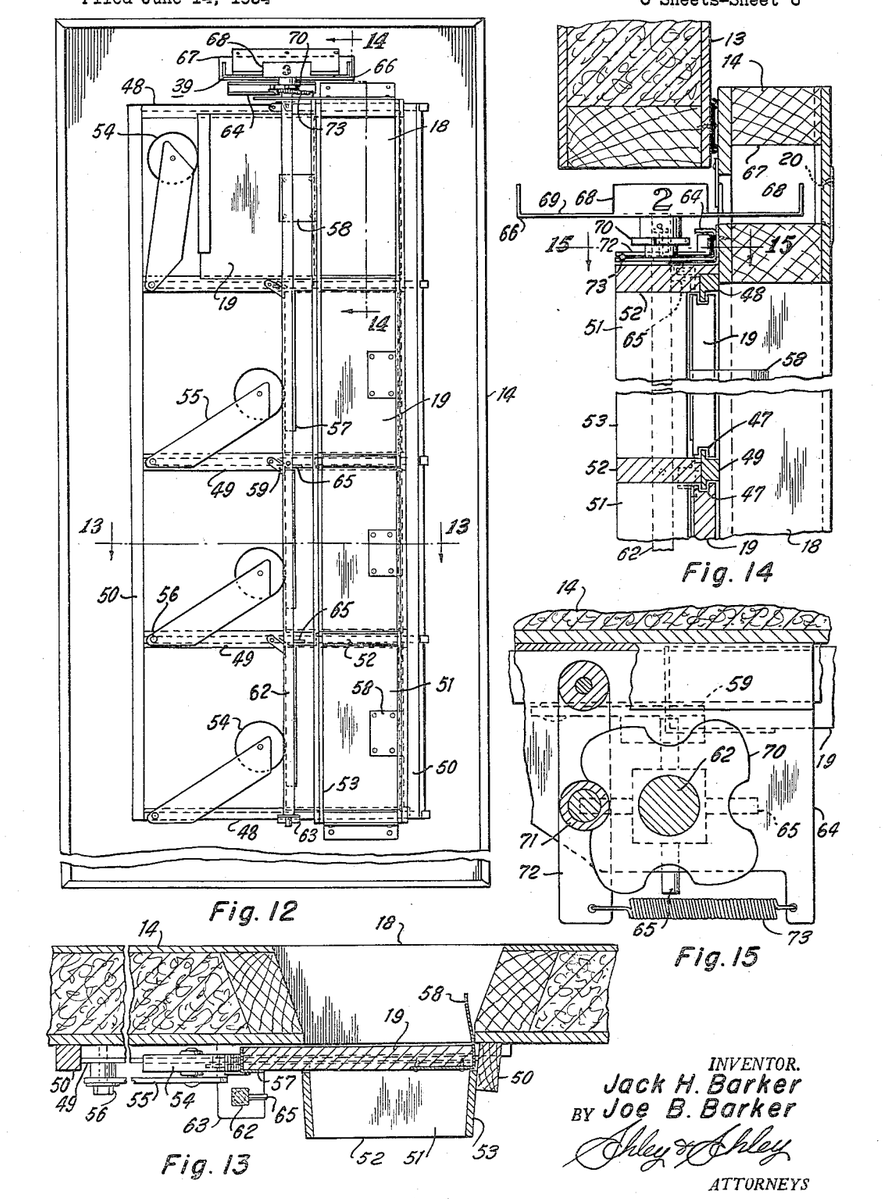
Fig. 12 is a rear elevational view of the service door of the machine.
Fig. 13 is a horizontal, cross-sectional view, taken on the line 13—13 of Fig. 12, showing the closure of one of the access openings and the common operating means.
Fig. 14 is a transverse, vertical, sectional view, taken on the line 14—14 of Fig. 12, showing the relation of the common operating means to the closures.
Fig. 15 is a horizontal cross-sectional view, taken on the line 15—15 of Fig. 14, showing the rotation resisting means of the operating means.

A combination cam and indicator wheel 66 is mounted on the upper end of the shaft 62 for rotation therewith above the bracket 64 and projects into an opening 67 in the door 14 alined with the sight window 20 (Figs. 2 and 14). The cam wheel has upright flanges 68 on its periphery bearing suitable numerals or other indicia registerable with and visible through the window. One flange is provided for and preferably in alinement with each pin 65 and the indicia of the flanges correspond to and identify the pins and their respective latches and closures, which closures may carry similar indicia (not shown) whereby the unlocked closure may be readily determined. Peripheral notches or slots 69 are formed in the wheel 66 between the flanges 68 for driving engagement by the angular arm 38 of the fixed magazine section 37 (Fig. 17). Upon the completion of a revolution of the carriage 24, the arm engages one of the notches 69 to impart a partial or one-quarter rotation to the cam wheel and its shaft and engage one of the pins with its latch while disengaging another pin from its latch whereby one closure is unlocked and another closure is relocked. For holding the cam shaft 62, its pins and wheel against accidental rotation, a peripherally notched or recessed disk 70 is fixed on said shaft between the wheel and the bracket 64 (Figs. 14 and 15). One notch or recess is provided for and preferably in alinement with each pin and each flange 68 of the cam wheel and is adapted to be engaged by an upright follower or roller 71 mounted on a transverse arm 72 having one end pivoted to the bracket. A spring 73 connects the opposite end of the arm 72 to the bracket for holding the roller 71 in resilient engagement with the disk 70 so as to resist rotation of the cam shaft.

Figure 3:
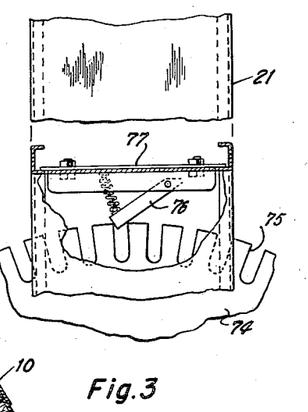
Fig. 3 is an enlarged plan view, partly in section, showing the reverse rotation lock.

In order to impart intermittent rotation to the carriage 24, an intermittent drive connection or means D is provided and includes a drive wheel or circular plate 74 mounted on the shaft 25 between said carriage and the hanger 21 and which may be connected to the uppermost spider 27. The drive wheel has indentations or serrations in the form of a plurality of elongated, radial notches or slots 75 equally-spaced in its periphery with one notch being provided for each of the circumferential magazine compartments 31 (Figs. 2 and 4). A spring-pressed detent or pawl 76 is mounted by an angular bracket 77 on one of the members of the hanger for engaging the notches and preventing reverse rotation of the wheel 74 (Fig. 3). It is noted that the motor 22 and speed reducer 23 may be mounted on a base plate 78 overlying and secured to the hanger and that said reducer has its drive shaft 79 depending through registering openings 80 in said hanger and base plate (Figs. 2 and 7) with its axis in substantial alinement with the periphery of the drive wheel (Figs. 8–11). As shown most clearly in Figs. 6–11, the drive means D includes an annular clutch plate or disk 81 mounted on the lower end of the drive shaft and fixed thereto by a set screw 82. The clutch disk has a notch 83 in its periphery for engagement by the inwardly-directed bill or hook 84 of a semicircular pawl or clutch arm 85 circumscribing a portion of the disk in spaced relation (Figs. 6 and 7). Above the disk 81, an annular drive member or plate 86 is journaled on the shaft 79 and in the lower end of the bore of an annular housing or collar 87 by suitable bearings 88 and 89. Suitable bolts 90 connect the collar to the underside of the reducer 23. The drive plate has a depending pin 91 for pivotally supporting the pawl intermediate its ends and a nut or screw-threaded lug 92 depending in spaced relation to the pin and the end of the pawl opposite its bill for receiving a stud bolt 93 having a lock nut 94. A spring 95 is confined between the stud bolt and pawl 85 for urging its bill 84 into engagement with the notch 83 of the clutch disk, whereby the drive plate 86 is releasably connected to the clutch disk for rotation with the drive shaft.

Figures 8, 9:
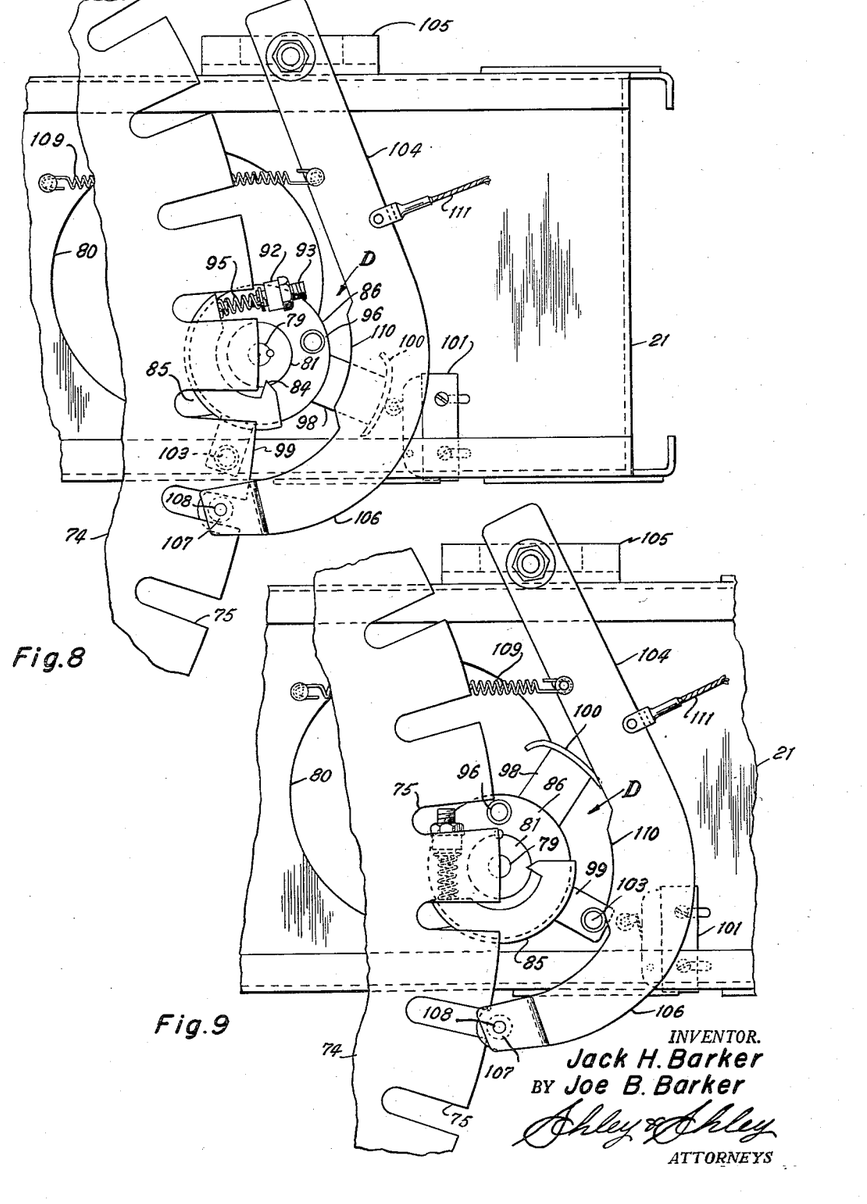
Fig. 8 is an underside plan view of the drive means and coacting locking means in locking relation to the drive wheel of the carriage.
Fig. 9 is a view, similar to Fig. 8, showing initial engagement of the drive means with the drive wheel and disengagement of the locking means.
Figures 10, 11:
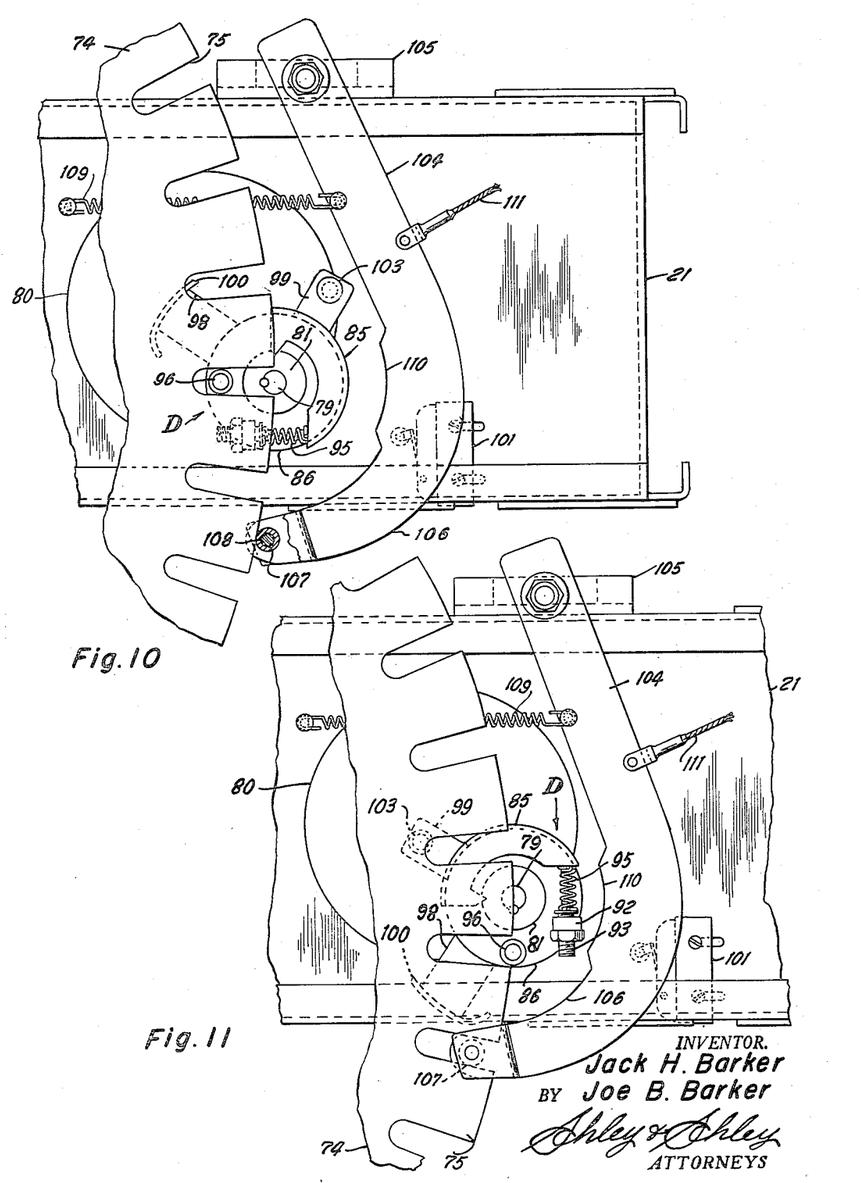
Fig. 10 is a view, similar to Fig. 8, showing driving engagement of the drive means and full disengagement of the locking means.
Fig. 11 is a view, similar to Fig. 8, showing initial disengagement of the drive means and reengagement of the locking means.

For driving engagement with the slots 75 of the drive wheel 74, a roller 96 is journaled on a drive element or pin 97 depending from the drive plate adjacent its lug 92 and is of a diameter slightly less than the width of said slots. Radial arms 98 and 99 project from the plate adjacent the pins 91 and 97 and at approximately a right angle to each other. The arm 98 carries an arcuate shoe 100 for actuating a micro-switch 101 having electrical connection (not shown) with the coin control mechanism 16 for stopping operation of the motor 22, while a roller 102 is journaled on an element or pin 103 depending from the arm 99 to actuate a transverse locking member in the form of an arm or lever 104 adapted to coact with the drive wheel and roller 96. As shown most clearly in Figs. 8–11, the locking lever is pivotally supported at one end from a bracket 105 carried by the hanger 21 and has an arcuate opposite or outer end portion 106 curved toward the drive wheel. A roller 107, of a diameter slightly less than the width of the slots 75, is journaled on an upright element or pin 108 carried by the extremity of the lever portion 106 for locking engagement with said slots and is held in engagement by a spring 109 extending between the inner end portion of the lever 104 and the hanger. For moving the locking roller out of engagement with one of the slots prior to driving engagement of the roller 96 with another slot, a cam surface 110 is formed on the arcuate end portion 106 of the lever inwardly of said locking roller and is adapted to be engaged by the roller 103 (Fig. 9). Between disengagement and reengagement, the locking roller is adapted to ride upon the periphery of the wheel between adjacent slots (Fig. 10). The locking lever and its roller 107 may be manually retracted for loading the magazine 29 by means of a suitable cable 111 and rod 112 (Fig. 2). It is noted that the spacing between the wheel slots 75 is substantially equal to the width of the magazine compartments 31 and that the diameter of the drive plate 86 is such that the diameter of the path of its roller 96 is substantially equal to said slot spacing. As a result, the drive wheel 74 is rotated a distance equal to the slot spacing upon each revolution of the drive plate to move an upright row of compartments into registration with the inner access openings 51 and to position an adjacent slot for engagement by the drive roller.

Upon loading of the magazine 29, all except one of the compartments is alined with one of the inner access openings 51. The combination cam and indicator wheel 66 is set to indicate the circumferential row having the empty compartment whereby the pin 65 of the cam shaft 62 engages the flange 61 of the latch 59 of the closure 19 alined with said empty compartment to lift and disengage said latch from said closure to permit opening of the latter by its handle 58. Since the latch operating means 31 is actuated upon the completion of each revolution of the carriage 24, the angular arm 38 is positioned immediately past or clockwise of the cam wheel so as to aline the left-hand or counterclockwise compartment row of the fixed magazine 37 with the access openings and its other or right-hand compartment row with said cam wheel. As a result, one of the compartments of the left-hand row is the empty one. During loading of the magazine, the locking lever 104 is retracted by the cable 111 and rod 112 to withdraw the roller 107 from engagement with the drive wheel 74 and its slots 75. Although the spring-pressed detent 76 prevents clockwise rotation, the carriage 24 may be manually turned in a counterclockwise direction (Figs. 2 and 3). Upon release of the cable and rod, the spring 109 pivots the locking lever toward the drive wheel to permit reengagement of the roller with one of the slots and it may be necessary to turn the drive wheel slightly in order to assure locking engagement of said roller. The normal or inoperative position of the intermittent drive means D and its elements is shown in Fig. 8.

It is noted that the wiring diagram forms no part of the present invention and is not illustrated. The vending machine is operated by inserting a coin or coins in the mechanism 16 so as to energize the motor 22 in the usual manner. The shaft 79 of the speed reducer 23 and the clutch disk 81 are rotated in a counter-clockwise direction and this rotation is imparted to the drive plate 86 due to the engagement of the pawl 84 of the clutch arm 85 with the notch 83 of said clutch disk (Fig. 9). In the event of binding of the carriage, the spring 95 permits pivoting of the clutch arm upon its pin 91 to disengage its pawl and permit relative rotation of the clutch disk and shaft so as to prevent the possibility of damaging the machine or drive means D. As shown in Fig. 9, initial rotation of the drive plate moves the roller 103 of the arm 99 into engagement with the arcuate end portion 106 of the locking lever for swinging said lever in a counter-clockwise direction away from the drive wheel 74 and moving its roller 107 outwardly of its engaged slot 75. At the same time, the drive roller 96 moves toward engagement with another slot. The final outward movement of the lever is due to the engagement of the roller 103 with the cam surface 110 of said lever, which cam surface is adapted to hold the lever away from the periphery of the drive wheel until the disengaged slot moves beyond the locking roller. Between the slots, the locking roller is adapted to ride upon the periphery of the drive wheel for engagement with the adjacent slot. The drive roller imparts clockwise rotation to the drive wheel as shown in Figs. 10 and 11. Upon outward movement and disengagement of the drive roller from its slot, the locking roller rides off of the periphery of the wheel into engagement with another slot and, as shown, this slot may be immediately adjacent the slot engaged by the drive roller. The drive plate 86 continues to rotate until the arcuate shoe 100 of the arm 98 engages the micro-switch 101 as shown in Fig. 8. As has been explained, the micro-switch is electrically connected to the mechanism 16 so as to stop operation of the motor 22.

From the foregoing, it should be readily apparent that each operation of the motor moves another upright row of compartments into registration with the inner access openings 51 whereby the article in the compartment alined with the unlocked closure 19 may be readily removed by opening said closure. Upon release of its handle 58, the closure is returned to its closed position due to the roller 54 and its lever 55. The closure remains unlocked until the carriage 24 makes a complete revolution and moves the arm 38 into engagement with one of the notches 69 of the cam wheel 66 (Fig. 17). All of the compartments of the circumferential row of the unlocked closure have been moved into successive registration with its inner access opening to permit removal of articles therefrom prior to this engagement. A partial or one-quarter rotation is imparted to the cam wheel and its shaft 62 to disengage the pin 65 from the latch 59 of the unlocked closure whereby said latch reengages and locks said closure. At the same time, another or adjacent pin engages the flange 61 of the latch of another or adjacent closure to lift and disengage said latch from said closure to permit opening thereof. This sequence of operation is repeated until all of the compartments of all of the circumferential rows have been moved into registration with the access openings and emptied by removing articles therefrom by means of the successively unlocked closures. When the mechanism is completely empty, the fingers 42 are free to move inwardly to permit rotation of the empty actuator rod 40 by the spring 43. As a result, the arm 44 is swung into engagement with the lever 45 of the micro-switch 46 to interrupt the electrical circuit to the motor 22 through the mechanism 16 and to complete the circuit to the empty light 17. It is noted that the vending operation may be commenced with any one of the circumferential rows so that a partially empty machine may be reloaded and returned to operation without rearranging the unvended or older articles. Usually, it is only necessary to rearrange the articles of one circumferential row in order to assure vending of the older articles before the fresh or new articles. Since the numerals on the flanges or indicia of the flanges 68 of the cam wheel are visible through the sight window 20 and since the closures carry similar indicia, the unlatched closure is readily ascertainable. It is noted that articles may be placed on the bottom wall 12 and within the carriage 24 for precooling.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. In a vending machine having a rotatable carriage supporting articles to be vended, a drive for imparting intermittent rotation to the carriage including a drive shaft, a drive member having connection with the shaft for rotation therewith, a notched wheel mounted on and rotatable with said carriage, drive means carried by and rotatable with the drive member for engagement with the notches of the wheel to transmit rotation thereto, locking means engaging one of said notches to prevent rotation of said wheel, means carried by and rotatable with said member for engaging the locking means to disengage said means from said notch simultaneously with the engagement of said drive means with another notch, and means for urging said locking means into engagement with another of said notches simultaneously with the disengagement of said drive means whereby at least one notch is engaged at all times.

2. The combination set forth in claim 1 wherein the locking means includes a pivoted lever having means for riding on the periphery of the wheel and engaging the notches thereof.

3. In a vending machine having a rotatable carriage supporting articles to be vended, a drive for imparting intermittent rotation to the carriage including a drive shaft extending parallel to the axis of rotation of said carriage, a circular plate mounted on and rotatable with said carriage, the circular plate having slots in its periphery, a drive element having connection with the shaft for rotation therewith and engageable with the slots for transmitting rotation to said plate, a pivoted locking member adapted to swing about an axis parallel to said shaft, an element carried by the locking member for engagement with the slots to lock said plate against rotation, an element having connection and rotatable with said shaft for engaging said member to pivot the same and disengage the locking element from one of said slots simultaneously with the engagement of the drive element with another slot and means for biasing said member toward said plate whereby said locking element rides on the periphery of said plate for engaging another of said slots simultaneously with the disengagement of said drive element and whereby one slot is engaged at all times.

4. In a vending machine, a housing having an access opening, a carriage rotatably supported in the housing and having circumferential rows of compartments, individual closures for each circumferential row of compartments mounted in the access opening, means for urging each closure into overlying relation with said opening, a latch for each closure, a common operating means for the latches including a rotatable member having elements offset angularly relative to each other for engaging and holding one of said latches at a time out of engagement with its closure, an actuating element carried by and rotatable with said carriage for engaging and imparting rotation to the member upon the completion of each revolution of said carriage to engage one of its elements with one of said latches so as to permit opening of its closure, the engaged element being rotated out of engagement with its latch upon subsequent rotation of said member and engagement of another element with another latch, each latch being pivotally mounted for re-engagement with its closure upon release of the latch by its element.

5. In a vending machine, a housing having an access opening, a carriage rotatably supported in the housing and having circumferential rows of compartments, individual closures for each circumferential row of compartments slidably mounted in the access opening, means for urging each closure into overlying relation with said opening, a pivoted latch independent of the urging means for each closure, common operating means for the latches including a rotatable member having elements offset angularly relative to each other for engaging and holding one of said latches at a time out of engagement with its closure, an actuating element carried by and rotatable with said carriage for engaging and imparting rotation to the member upon the completion of each revolution of said carriage to engage one of its elements with one of said latches so as to permit opening of its closure, the engaged element being rotated out of engagement with its latch upon subsequent rotation of said member and engagement of another element with another latch whereby each latch re-engages its closure upon release of the latch by its element.

References Cited in the file of this patent

UNITED STATES PATENTS

| | | |
|---|---|---|
| 1,193,235 | Chilson | Aug. 1, 1916 |
| 1,366,129 | Moser | Jan. 18, 1921 |
| 1,582,933 | King | May 4, 1926 |
| 2,016,127 | Weiler | Oct. 1, 1935 |
| 2,672,389 | Gabrielsen | Mar. 16, 1954 |
| 2,678,251 | Stewart | May 11, 1954 |
| 2,687,825 | Galin | Aug. 31, 1954 |

FOREIGN PATENTS

| | | |
|---|---|---|
| 633,024 | Germany | of 1936 |